H. A. DAVIS.
WASHER.
APPLICATION FILED JAN. 29, 1909.

938,302.

Patented Oct. 26, 1909.

Witnesses
Frank B. Hofman

Inventor
Henry A. Davis
By Victor J. Evans
Attorney

UNITED STATES PATENT OFFICE.

HENRY A. DAVIS, OF GILMANTON, NEW HAMPSHIRE.

WASHER.

938,302.  Specification of Letters Patent.  Patented Oct. 26, 1909.

Application filed January 29, 1909. Serial No. 474,954.

*To all whom it may concern:*

Be it known that I, HENRY A. DAVIS, a citizen of the United States of America, residing at Gilmanton, in the county of Belknap and State of New Hampshire, have invented new and useful Improvements in Washers, of which the following is a specification.

This invention relates to washers of that type made up of two parts, one removable from the other, and one of the principal objects of the same is to provide a washer in which the removable part is firmly held in locked position when the two parts of the washer are assembled.

Another object of the invention is to provide a washer which may be applied to various parts of machinery without the necessity of removing the parts by separating the two members of the washer and applying them in place before the two members are assembled and locked together.

These and other objects may be attained by means of the construction illustrated in the accompanying drawing, in which,—

Figure 1:
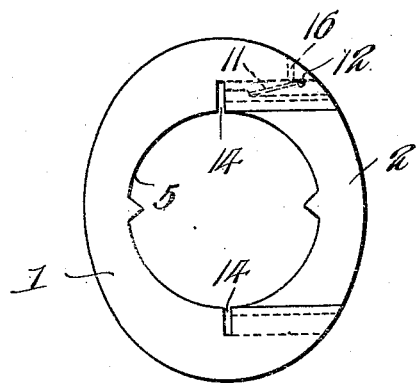
Figure 2:
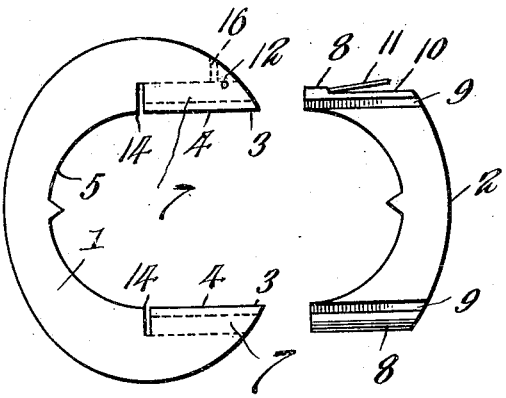
Figure 3:
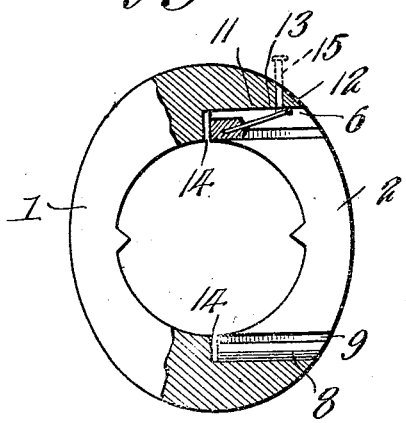
Figure 4:
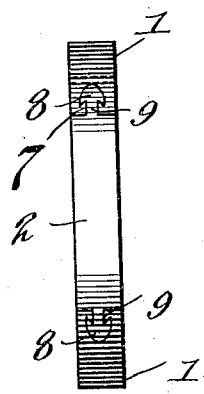
Figure 5:
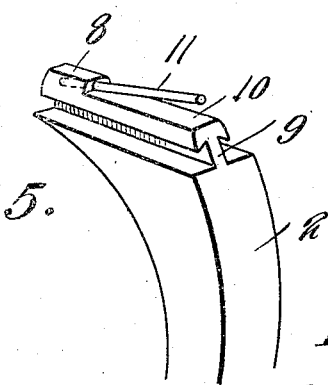

Figure 1 is a face view of a washer made in accordance with my invention, the two members of the washer being assembled and locked in position. Fig. 2 is a side elevation or face view of the washer, the two members being separated. Fig. 3 is an elevation and partial section of the washer in locked position and showing a key for unlocking the washer in dotted lines. Fig. 4 is an edge view of the washer. Fig. 5 is a detail perspective view, showing the detachable member and the spring lock secured thereto for holding the member in place.

Referring to the drawing, the numeral 1 designates the main body portion of the washer and 2 the detachable member thereof. The body portion 1 is cut from suitable material and forms a portion of a ring comprising the lips 3 having substantially plain inner edges 4 and a curved inner wall 5. Formed longitudinally of the edges 4 are the grooves 6, said grooves comprising an enlarged portion and a narrow slot extending from the enlarged portion to the edge 4. The detachable member 2 comprises the remaining portion of the washer and is shaped to complete the ring 2, said member 2 having its opposite ends formed with beads 8 extending along the opposite ends thereof, and adjacent to the beads are contracted necks 9. One of the beads 8 is cut away, as at 10, to form a plain flat surface, and secured to said bead is an inclined lock member 11.

In uniting the two parts of the washer the beads 8 are inserted into the enlarged portions 6 of the grooves in the part 1, the necks 9 occupying the slots 7. When the part 2 has been pushed fully within the member 1, the spring lock member 11 at its end bears against a pin 12 extending across the member 1, as shown more particularly in Fig. 3.

Oppositely disposed recesses 14 are formed in the member 1 at the inner ends of the grooves 6.

In order to unlock the member 2 from the member 1 a key 15 is inserted in a hole 16 formed in the edge of the member 1 in line with the locking member 11. By pushing down upon the key the locking member 11 is disengaged from the pin 12, after which the member 2 may be readily withdrawn.

From the foregoing it will be obvious that a washer made in accordance with my invention can be applied to a shaft or to any part of the machinery without detaching the parts, and that the two members of the washer may be readily separated for this purpose, and when the washer is assembled the two members are firmly locked in position and cannot be readily separated by accident.

I claim:—

1. A washer comprising a body portion having plain lips provided with grooves and slots leading from said grooves to the edge of the lips, a detachable portion provided with beads and reduced necks adjacent to the beads, said detachable portion being connected to the body portion by engaging the beads in the grooves, and a spring locking device for holding said detachable portion in connection with said body portion.

2. A washer comprising a body portion having grooved lips, a detachable portion with ribs and beads to fit said grooves, a spring lock on one of the beads, and a cross pin on the body portion of the washer to be engaged by said spring lock for holding said body portion and said detachable portion together.

In testimony whereof I affix my signature in presence of two witnesses.

HENRY A. DAVIS.

Witnesses:
 WILLIAM J. MORRIS,
 STUART E. LEAVY.